United States Patent [19]

Legrand et al.

[11] Patent Number: 5,283,042
[45] Date of Patent: Feb. 1, 1994

[54] PROCESS FOR THE PURIFICATION OF WHITE PHOSPHORUS

[75] Inventors: Jean-Claude Legrand, Lyons; Philippe Bourdauducq, Chaponost; Thierry Bulinge, Epierre, all of France

[73] Assignee: Atochem, Puteaux, France

[21] Appl. No.: 811,979

[22] Filed: Dec. 23, 1991

[30] Foreign Application Priority Data

Dec. 21, 1990 [FR] France ................. 90 16165

[51] Int. Cl.$^5$ ......................................... C01B 25/047
[52] U.S. Cl. ............................................... 423/322
[58] Field of Search ..................................... 423/322

[56] References Cited

U.S. PATENT DOCUMENTS

| | | | |
|---|---|---|---|
| 3,836,675 | 9/1974 | Hartlapp et al. | 423/322 |
| 4,273,752 | 6/1981 | Lehr et al. | 423/322 |
| 4,664,896 | 5/1987 | Hall | 423/322 |

Primary Examiner—Wayne Langel
Attorney, Agent, or Firm—Burns, Doane, Swecker & Mathis

[57] ABSTRACT

Impure white phosphorus values are purified to such extent as to be useful, e.g., for the preparation of $P_4S_{10}$ therefrom, by (a) reacting liquid, impure white phosphorus with an aqueous suspension of a purifying amount of active charcoal to provide a mixture of purification, (b) separating such mixture of purification into a phosphorus-containing phase and an aqueous phase, (c) separating this phosphorus-containing phase, e.g., by means of a silica filter, into purified liquid white phosphorus and spent active charcoal, and (d) recovering the white phosphorus thus purified.

15 Claims, 1 Drawing Sheet

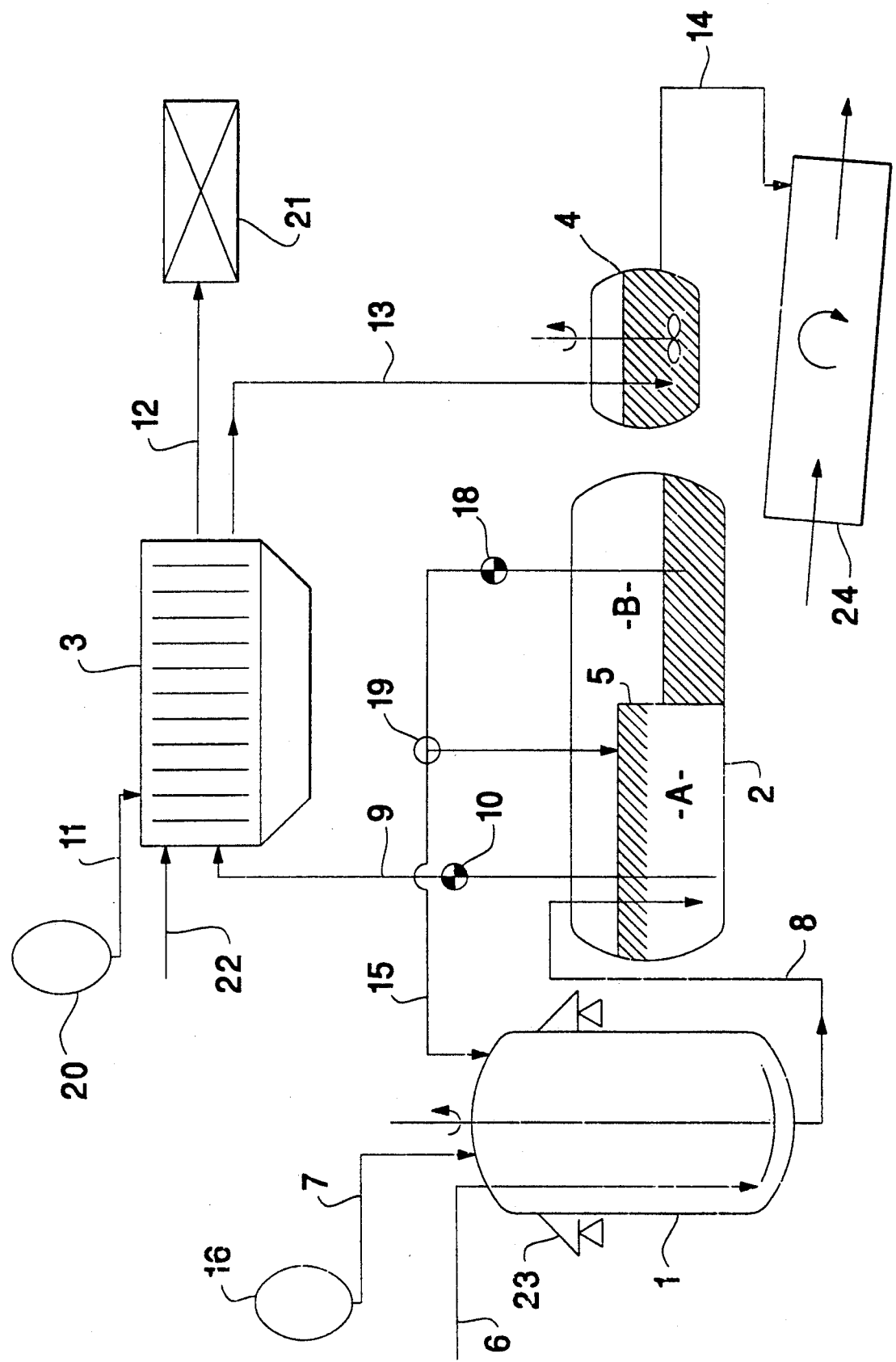

PROCESS FOR THE PURIFICATION OF WHITE PHOSPHORUS

BACKGROUND OF THE INVENTION

1. Field of the Invention

The present invention relates to the purification of impure white phosphorus values.

This invention also relates to apparatus for carrying out such purification of impure white phosphorus.

2. Description of the Prior Art

White phosphorus is essentially produced industrially by reduction of phosphates by carbon in the presence of silica in an electric furnace.

The white phosphorus produced by this electrothermal process contains a small amount of impurities, which may be dissolved or remain in the solid state and are of organic nature (hydrocarbons and phenol compounds) or inorganic nature (iron, arsenic, and the like).

These impurities are not generally detrimental for a large number of uses of the white phosphorus. However, certain preparative processes of phosphorus-containing derivatives, in particular the preparation of $P_4S_{10}$, require using a white phosphorus starting material of high purity and virtually devoid of organic compounds.

Indeed, the presence of such compounds causes the formation of colored products which are difficult to separate off.

Numerous patents (e.g., French Patent No. 2,057,536 and German Patent No. 2,035,432) disclose that white phosphorus originating from the electrothermal process may be purified by treating it with $H_2SO_4$ under variable conditions of concentration and temperature.

These procedures, however, present certain disadvantages.

On the one hand, peroxides may form, with attendant risk of violent and uncontrollable reactions.

On the other, despite numerous washings, a not insignificant amount of $H_2SO_4$ (up to 50 ppm) remains which occasions risks of corrosion.

Moreover, although this treatment has a certain efficiency with regard to the removal of organophosphorus materials, it only slightly reduces the content of suspended material in the purified phosphorus.

Finally, these processes produce large amounts of aqueous effluents—more than 2 tons of 5% sulfuric acid polluted by organic matter per ton of treated phosphorus—these amounts militating against the economy of the process and being environmentally damaging.

U.S. Pat. No. 4,664,896 describes that liquid white phosphorus may be purified by treatment with active charcoal.

In this process, the filter cake essentially containing spent active charcoal, phosphorus, impurities removed from the purified phosphorus and the filter agent or material is thinned with liquid white phosphorus such as to provide a transportable slurry.

This slurry is recycled to the electric furnace for the production of phosphorus.

This procedure presents certain disadvantages, such as, for example, the recycling of the phosphorus-containing slurry to the electric furnace. Such slurry inevitably contains water in a not insignificant amount, introduced, for example, by the filter agent or the spent active charcoal. This water, in the presence of phosphorus and carbon, under the elevated temperature conditions of the electric furnace, is liable to result in the formation of hydrogen, with attendant risk of explosion, and of phosphine $PH_3$. This toxic compound is of a type which pollutes gaseous effluents.

Furthermore, its formation gives rise to a useless and not insignificant consumption of phosphorus.

Moreover, the use of liquid phosphorus to produce a transportable slurry renders the process expensive and, in particular, requires a supplementary investment for completely safe transport of the liquid white phosphorus used in this manner.

SUMMARY OF THE INVENTION

Accordingly, a major object of the present invention is the provision of an improved process for the purification of impure white phosphorus using active charcoal, comprising introducing an aqueous suspension of active charcoal and liquid white phosphorus into a reaction vessel and recovering the purified liquid white phosphorus by separating it from the spent active charcoal, and wherein:

(a) the mixture to be purified contained in the reaction vessel is phase-separated into an aqueous phase and a phosphorus-containing phase in a storage vessel, before separating the purified liquid white phosphorus from the spent active charcoal, (b) the phosphorus-containing phase is transferred into a separation zone wherein the purified white phosphorus is separated from the spent active charcoal, (c) the solid phase from the separation of the purified white phosphorus from the spent active charcoal is converted into an aqueous suspension, (d) such aqueous suspension is preferably transferred into a calcination zone.

BRIEF DESCRIPTION OF THE DRAWING

The Figure of Drawing is a schematic/diagrammatic representation of the process/apparatus according to the present invention.

DETAILED DESCRIPTION OF THE PREFERRED EMBODIMENTS OF THE INVENTION

More particularly according to the present invention, the white phosphorus is maintained at a temperature higher than its melting point, and preferably at a temperature ranging from 55° C. to 70° C.

The reaction is advantageously carried out under an inert gas, such as nitrogen, under a relative pressure of at least 1 bar and preferably under a relative pressure ranging from 1.2 bar to 2 bar.

The reaction vessel may be charged successively with water, the liquid white phosphorus to be purified and active charcoal, advantageously in the form of an aqueous suspension, in such manner that the liquid phosphorus is poured into the reaction vessel under water. If appropriate, the mixture may be supplemented with phosphorus-containing water.

By "phosphorus-containing water" is intended recycled water which has already contacted the liquid white phosphorus.

The mixture of purification is stirred vigorously.

The contact time between the white phosphorus to be purified and the active charcoal is at least 30 minutes and preferably ranges from 1 to 3 hours. This contact time essentially depends on the content of organic impurities in the white phosphorus to be purified.

The aqueous suspension of active charcoal may be prepared beforehand in a separate vessel.

As regards the active charcoal, activated wood charcoals can be used having a specific surface area of at least 1,000 m$^2$/g and preferably ranging from 1,100 to 1,300 m$^2$/g. The aqueous suspension contains at least 10% by weight of active charcoal and preferably from 15% to 20% by weight.

At least 1 kg of active charcoal and preferably an amount ranging from 2 kg to 20 kg will be used per ton of phosphorus to be purified.

According to the present invention, the transfer of all of the phases of the mixture of purification into the storage vessel, which has been previously filled with water, is effected by introducing same under said water. This transfer may advantageously be carried out under nitrogen pressure.

Phase separation of the phases of the said purification mixture is carried out in this storage vessel. The temperature at which the phase separation of the mixture of purification is carried out is at least 50° C. and preferably ranges from 60° C. to 75° C. The so-called "phosphorus-containing phase" which has settled out essentially consists of purified liquid white phosphorus and spent active charcoal.

The aqueous phase intimately admixes with the water contained in the storage vessel. This water, termed "phosphorus-containing water", may advantageously be used to prepare the aqueous suspension of active charcoal or serve as water for formulating the purification mixture.

According to the present invention, this storage vessel makes it possible to supply, as "settled phosphorus-containing phase", a zone designated the separation zone, in which the separation of the purified liquid white phosphorus from the spent active charcoal is effected. This separation may be carried out by various means, such as centrifuging, filtration or natural settling.

According to the invention, filtration through a preliminary layer will preferably be employed as the separation technique. To this end, the filter agent selected will be an infusorial earth (or kiesselguhr) having a silica content of at least 80% and preferably a silica content ranging from 85% to 90%.

The preliminary layer is generally deposited on the filter from a suspension of filter agent in water, which may be phosphorus-containing water, this suspension being prepared in a separate vessel.

At least 500 g of filter agent and preferably an amount ranging from 1 to 2 kg will be used per ton of phosphorus to be purified.

According to this invention, the "settled phosphorus-containing phase" is transferred in liquid form from the storage tank to a filter, for example using a pump.

The purified liquid white phosphorus is transported to a storage zone.

The filter cake, namely, the solids retained in the filter and containing the spent active charcoal, the filter agent and the suspended matter initially contained in the phosphorus to be purified, is periodically removed by any known means (vibration, inert gas back-flow, phosphorus-containing water backflow or centrifuging) and preferably by resuspending it in phosphorus-containing water such as to produce a transportable aqueous suspension. The latter may advantageously be produced in the separation zone. The temperature of the water required to produce this suspension is generally at least 50° C. and preferably ranges from 60° C. to 70° C.

This aqueous suspension, essentially consisting of water, contains phosphorus in a small proportion, spent active charcoal, filter agent and inorganic material.

Such aqueous suspension may be transported to a calcination zone.

According to the process of the invention, this calcination zone comprises the calcination furnace for phosphate minerals.

The process of the invention is very particularly applicable to the purification of the white phosphorus which essentially emanates from the electrothermal process and can contain up to 1% of organic impurities and diverse inorganic impurities, such as iron, arsenic, and the like.

The subject process is very particularly applicable to the purification of the white phosphorus used for the preparation of $P_4S_{10}$.

The accompanying Figure of Drawing illustrates the process/apparatus according to the present invention, wherein a reaction vessel 1, which is generally cylindrical and substantially vertical, is fitted with an efficient stirrer; a storage tank 2, which is of cylindrical shape and substantially horizonal, comprises two compartments (A) and (B) communicating with one another and separated by a substantially vertical partition 5; a filter 3, comprising a substantially horizontal cylindrical casing, is provided with circular filter frames; a dispersing relay tank 4 of cylindrical shape, which is essentially vertical, is provided with a stirrer; a feed inlet 6 permits the white phosphorus to be purified to be introduced in liquid form into the lower part of the reaction vessel 1; a feed inlet 7 permits the aqueous suspension of active charcoal prepared in a stirred reactor 16 to be introduced into the upper part of the reaction vessel 1; a line 8 permits the contents of the reaction vessel 1 to be transferred into the lower part of compartment (A) of the storage tank 2; a feed inlet 9 permits the settled phosphorus-containing phase to be transferred into the filter 3; a feed inlet 11 permits the filter agent, in the form of an aqueous suspension prepared in a reactor 20, to be introduced into the filter 3; a discharge line 12 permits transporting the purified white phosphorus in liquid form to a storage zone 21; and a line 13 permits the filter cake resuspended in phosphorus-containing water to be transferred to the dispersing relay tank 4, and a discharge outlet 14 for the aqueous suspension.

The crude white phosphorus to be purified originates from storage tanks where it is maintained liquid. According to the present invention, it is preferably introduced into the lower part of the vessel 1 previously filled with water.

Advantageously, an amount of phosphorus-containing water emanating from compartment (B) of the storage tank 2 may be introduced via the line 15.

The reaction vessel 1, the storage tank 2, the filter 3 and the dispersing relay tank 4 may be provided with heating systems (not shown) which include a jacket, inside of which water circulates which is maintained at a temperature which permits the various media to be conveyed at a temperature of generally at least 50° C. and preferably at a temperature ranging from 60° to 80° C.

The vessel 1 may advantageously be provided with at least one counter-blade arranged vertically (also not shown).

A pump 10 permits the settled phosphorus-containing phase to be transferred from compartment (A) of the tank 2 to the filter 3.

Advantageously, the compartment (A) of the storage tank 2 represents at least 50% of the total volume of said storage tank 2 and preferably from 55% to 70%.

The amount by volume of water floating on the surface of the settled phosphorus-containing phase is not generally less than 15% (by volume) of the total volume of this compartment.

Advantageously, supernatant water overflows from compartment (A) into compartment (B), and, in order to maintain the settled phosphorus-containing phase permanently covered, it is possible to circulate water from compartment (B) into compartment (A) by means of the line 15 and the pump 18. A valve 19 permits make-up phosphorus-containing water to be introduced into the reaction vessel 1.

The purified white phosphorus is separated from the spent active charcoal in a filter 3 provided with filter frames mounted vertically on a horizontal collector, which advantageously is rotated during the cleaning operation, namely, during removal of the filter agent. This cleaning is advantageously carried out under the pressure of hot water supplied via line 22 or by phosphorus-containing water originating from compartment (B) of the storage vessel 2.

The plates are advantageously fabricated from stainless steel metal gauze.

The filter is filled with the aqueous suspension containing the filter agent and a preliminary layer is then produced. The water is then displaced by the settled phosphorus-containing phase, which is then filtered; the purified white phosphorus in liquid form is then transported to a storage zone 21 after its purity has been determined.

According to the invention, the filter cake is removed from the plates and then transferred to the dispersing relay tank 4 previously filled with hot water, where it is maintained in suspension with the aid of vigorous stirring.

The aqueous suspension is transported to the furnace 24 for the calcination of phosphate rock.

Advantageously, it is introduced at a location close to the burners. The carbon originating from the spent active charcoal is converted to $CO_2$, whereas the phosphorus is converted to $P_2O_5$, which can be combined with the rock lime.

A monitoring system 23 located in the upper part of the reactor 1 permits the amounts of materials introduced to be continuously determined.

The other elements of apparatus used to carry out the process according to the invention, such as instrumentation (manometers, thermometers, pressure controllers, electrical means, level detectors, and the like) are per se known to this art and will not be further described.

The present invention presents numerous advantages.

It permits a phosphorus of high purity to be obtained which is virtually devoid of organic matter—less than 50 ppm—as well as devoid of metal elements, such as iron, and suspended matter.

The process of the invention also makes it possible to prevent all phosphorus losses, since it permits the recovery of the phosphorus likely to be lost in the various filtering and settling operations.

Finally, the recycling of the filtration agent in the form of an aqueous suspension to the calcination furnace enables all of the liquid or solid effluents to be destroyed and thus prevents the accumulation of effluents which are toxic to a greater or lesser extent.

In order to further illustrate the present invention and the advantages thereof, the following specific example is given, it being understood that same is intended only as illustrative and in nowise limitative.

EXAMPLE:

(a) The apparatus used was that shown in the accompanying single Figure of Drawing, and had the following characteristics:

Volume of the reaction vessel 1: 9 m$^3$

Volume of the storage tank 2: 55 m$^3$ which was divided into 30 m$^3$ for compartment (A) and 25 m$^3$ for compartment (B), Volume of the dispersing tank 4: 25 m$^3$ Surface area of the filter 3: 32 m$^3$ (b) Operating conditions:

The following materials were introduced into the reaction vessel 1:

(i) 1.5 m$^3$ of water which was heated to 65° C., (ii) 10,380 kg of liquid white phosphorus at 60° C. containing 1,000 ppm of organic matter and 4,000 ppm of suspended matter, and (iii) an aqueous suspension of 50 kg of Acticarbone ® 2 S, which had a BET specific surface area of 1,150 m$^2$/g, in 300 l of water at 65° C.

This suspension was previously prepared in a stirred vessel 16.

The liquid white phosphorus was introduced under water.

The mixture was stirred vigorously for 2 hours, while maintaining the temperature at 65° C.

The entire contents of the reaction vessel 1 were then transferred to compartment (A) of the storage tank 2, which had previously been filled with 5 m$^3$ of water at 65° C. This transfer was carried out under a nitrogen overpressure and the entire contents of the reaction vessel were introduced under water.

When phase separation was complete, which was monitored by means of level indicators, the settled phosphorus-containing phase was transferred to the filter 3, to which the preliminary layer had previously been introduced.

Thus, the filter 3 was filled with an aqueous suspension containing 10 kg of Clarcel prepared in a vessel 20. The preliminary layer was produced by circulating the aqueous Clarcel suspension inside the filter until it was exhausted (formation of the preliminary layer by the rotation principle).

Subsequently, the settled phosphorus-containing phase displaced the water of the spent aqueous suspension and was filtered.

The purified liquid white phosphorus was transferred to a storage zone 21.

10,000 kg of white phosphorus having the following characteristics were recovered in this way:

Organic matter: 40 ppm

Suspended matter: virtually nonexistent.

The filter cake was resuspended in the filter 3 by injecting phosphorus-containing water onto the plates.

A transportable aqueous suspension was obtained which was transferred to the relay tank 4 previously filled with vigorously stirred water at 65° C.

The aqueous suspension, containing about 50% by weight of white phosphorus, 25% by weight of water and 25% of diverse materials, essentially comprising the spent active charcoal, the filter agent and the initial suspended matter, was introduced into a furnace for calcination of phosphate minerals, preferably into the flame-burner zone, which was at a temperature close to 1,200° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the purification of impure white phosphorus values, comprising (a) reacting liquid, impure white phosphorus with an aqueous suspension of a purifying amount of active charcoal to provide a mixture of purification, (b) separating said mixture of purification into a settled phase consisting essentially of a spent active charcoal and phosphorus-containing phase and an aqueous phase, (c) separating said spent active charcoal and phosphorus-containing phase into purified liquid white phosphorus and spent active charcoal, and (d) recovering said purified white phosphorus.

2. The process as defined by claim 1, said impure white phosphorus values comprising an electrothermal process white phosphorus.

3. The process as defined by claim 1, comprising maintaining the temperature of the white phosphorus at a value higher than its melting point.

4. The process as defined by claim 3, comprising maintaining the temperature of the white phosphorus at from 55° C. to 70° C.

5. The process as defined by claim 3, comprising reacting said liquid, impure white phosphorus with said aqueous suspension under an atmosphere of an inert gas.

6. The process as defined by claim 1, said active charcoal comprising an activated wood charcoal having a specific surface area of at least 1,000 $m^2/g$.

7. The process as defined by claim 1, comprising phase-separating said mixture of purification at a temperature of at least 50° C.

8. The process as defined by claim 2, comprising filtering said phosphorus-containing phase into purified liquid white phosphorus and spent active charcoal.

9. The process as defined by claim 8, comprising filtering said phosphorus-containing phase by means of a silica filter material.

10. The process as defined by claim 8, further comprising converting the filter cake into an aqueous suspension thereof.

11. The process as defined by claim 10, further comprising calcining said aqueous suspension.

12. The process as defined by claim 1, comprising separating said mixture of purification in a compartmentalized storage vessel.

13. The process as defined by claim 1, wherein step (c) is carried out by centrifuging, filtration or natural setting.

14. The process as defined by claim 1, wherein step (c) is carried out by filtration through a preliminary layer containing a filtering agent.

15. A process for the purification of impure white phosphorus values, comprising (a) reacting liquid, impure white phosphorus with an aqueous suspension of a purifying amount of active charcoal to provide a mixture of purification, (b) separating said mixture of purification into a spent active charcoal and phosphorus-containing phase and an aqueous phase, (c) separating said spent active charcoal and phosphorus-containing phase into purified liquid white phosphorus and spent active charcoal, and (d) recovering said purified white phosphorus, step (b) being carried out by settling the spent active charcoal and phosphorus-containing phase in a vessel.

* * * * *